United States Patent [19]
Meister

[11] Patent Number: 4,993,007
[45] Date of Patent: Feb. 12, 1991

[54] METHOD FOR ASSEMBLING A WATCH CASE

[75] Inventor: Leonhard Meister, Selzach, Switzerland

[73] Assignee: ETA SA Fabriques d'Ebauches, Grenchen, Switzerland

[21] Appl. No.: 370,112

[22] Filed: Jun. 22, 1989

Related U.S. Application Data

[62] Division of Ser. No. 168,019, Mar. 14, 1988, abandoned.

[30] Foreign Application Priority Data

Mar. 23, 1987 [CH] Switzerland ........................ 01097/87
Oct. 15, 1987 [CH] Switzerland ........................ 04035/87

[51] Int. Cl.⁵ ........................ B23B 31/16; G04B 37/00
[52] U.S. Cl. ........................ 368/294; 368/295; 368/280; 29/177; 156/73.1; 156/73.5
[58] Field of Search ........................ 368/294–296; 156/73.1, 73.5, 196, 69, 221; 264/249; 29/177, 179

[56] References Cited

U.S. PATENT DOCUMENTS

| | | | |
|---|---|---|---|
| 4,023,347 | 5/1977 | Hyaber | 368/282 |
| 4,059,294 | 11/1977 | Falcone | 156/73.1 |
| 4,136,515 | 1/1979 | Thompson | 368/294 |
| 4,197,698 | 4/1980 | Finger | 368/295 |
| 4,259,419 | 3/1981 | Uba et al. | 156/75.1 |
| 4,488,345 | 12/1984 | Muller et al. | 29/177 |
| 4,558,957 | 12/1985 | Mock et al. | 368/294 |
| 4,712,809 | 12/1987 | Legris | 156/73.5 |

FOREIGN PATENT DOCUMENTS

| | | | |
|---|---|---|---|
| 2656800 | 7/1977 | Fed. Rep. of Germany | 156/73.1 |
| 3014995 | 11/1980 | Fed. Rep. of Germany | . |
| 3405831 | 8/1984 | Fed. Rep. of Germany | 368/280 |
| 1363424 | 12/1964 | France | . |
| 2491644 | 9/1982 | France | . |
| 160880 | 12/1980 | Japan | 368/28 |
| 58-80586 | 5/1983 | Japan | . |
| 348117 | 9/1960 | Switzerland | . |
| 443158 | 1/1968 | Switzerland | . |
| 2100891 | 1/1983 | United Kingdom | . |

Primary Examiner—Bernard Roskoski
Attorney, Agent, or Firm—Griffin Branigan & Butler

[57] ABSTRACT

The watch case of this invention includes a caseband-back of plastic material, a metallic bezel and a packing to assure impermeability between the caseband-back and the bezel. A first annular seat extending radially into the bezel receives an annular protuberance integrally formed with the caseband in a manner such that the caseband-back and bezel become inseparable. At the same time a packing is compressed into a second seat to render impermeable the discontinuity between the caseband-back and the bezel. Assembly of the caseband-back to the bezel is effected by ultrasonic vibrations.

15 Claims, 2 Drawing Sheets

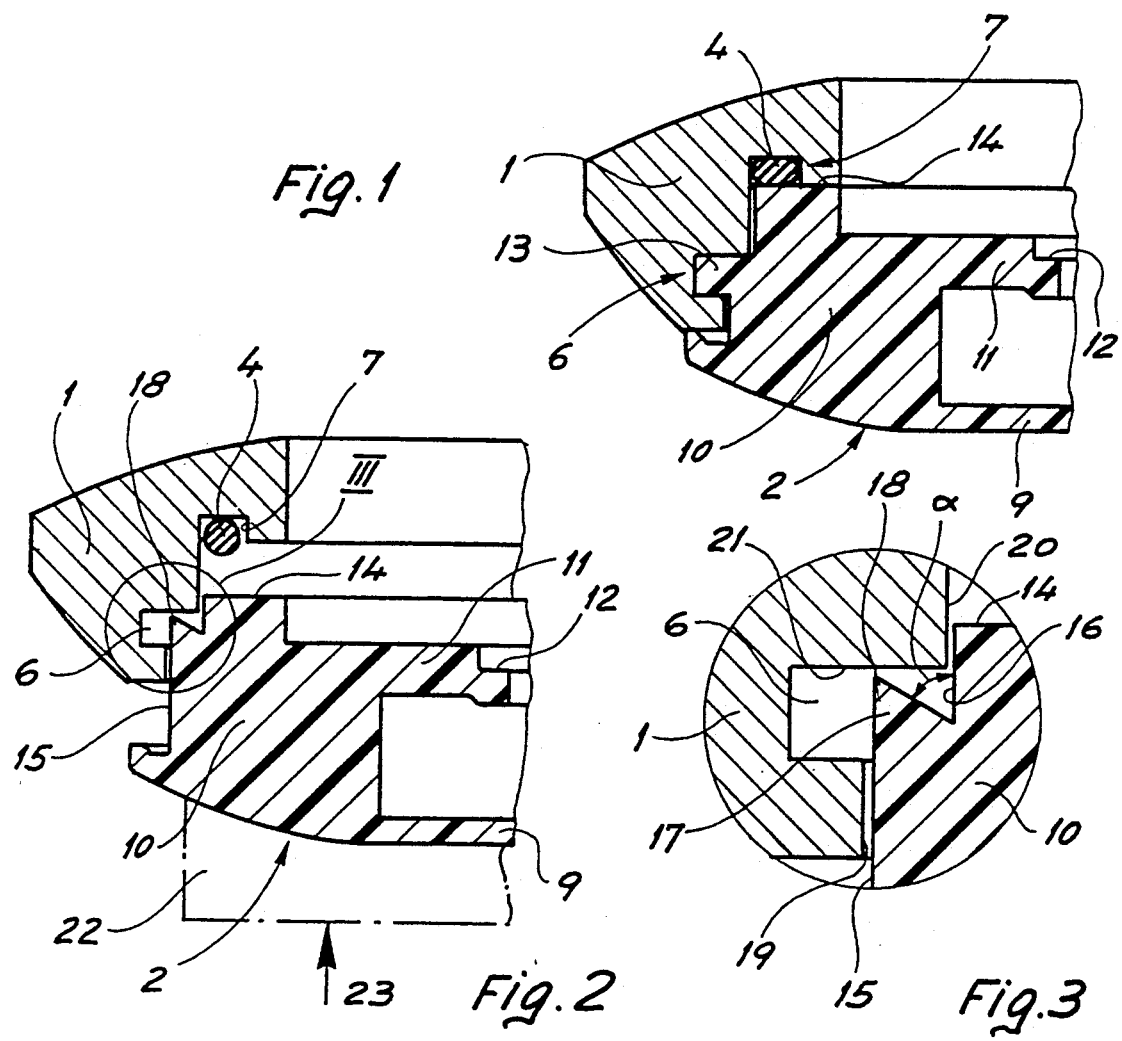
Fig. 1
Fig. 2
Fig. 3
Fig. 4
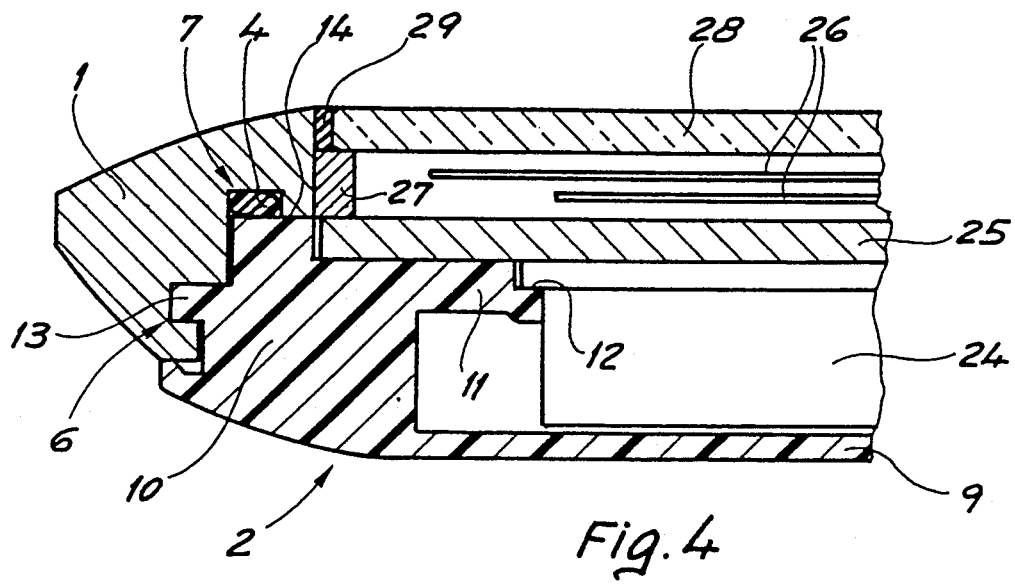

METHOD FOR ASSEMBLING A WATCH CASE

This is a division of application Ser. No. 07/168,019, filed Mar. 14, 1988, now abandoned.

This invention concerns a watch case including a caseband at least a peripheral portion of which is of plastic material, a back, a metallic bezel covering the caseband and extending over at least a portion of the outer edge face exhibited by the caseband and impermeable assembly means for the caseband and the bezel.

It likewise concerns a set of components intended to constitute such watch case as well as a method of assembly employing such set of components.

BACKGROUND OF THE INVENTION

The patent document No. JP-B-55-17958 has already described a watch case wherein a caseband-back of plastic material bears a disc-shaped back integrally formed with a portion referred to as the caseband. This caseband-back is overmoulded on the interior of a metallic bezel, the latter including attachment teeth rendering the whole impossible to dismantle once the injection of the plastic has taken place. In order to assure impermeability between the caseband-back and the bezel, there is arranged, prior to the injection, a packing mounted on a shoulder of the bezel. This packing is then compressed during the injection of the back thus assuring the desired impermeability.

This method of proceeding is not satisfactory for at least three reasons. Initially, the packing is likely to be damaged by the high temperature of the liquid material which is used to compress it. One might of course choose for such packing a material particularly resistant to the temperature involved, but this matter would not necessarily be the best as far as concerns the function to be assured, which is to say the impermeability of the watch case. As a further objection the proposed packing, surrounding as it does only two internal shoulders of the bezel, is not sufficiently localized or guided which may bring about its displacement or even its rupture at the moment of injection of the plastic material. Finally no matter how precise the mould, it leaves traces on the portions which must not be covered-here the visible portion of the bezel-this necessitating a subsequent cleaning or deburring and such operations may be considered as relatively costly.

Although concerning the impermeable fastening of a watch crystal of organic material to a watch case, one could employ in order to assemble a bezel onto a caseband, the procedure proposed by the French patent application Ser. No. FRA-2 491 644. This application proposes to provide the bezel with a groove turned towards the interior thereof. The crystal is supported on a shoulder of this bezel and there is applied thereto a heated punch having an annular form over the periphery of the crystal in order to plastically deform the latter and thus to cause penetration of a portion of the plastic material to the interior of the groove provided in the bezel. Conjointly therewith, there is compressed a packing between the bezel and the crystal. Such a procedure certainly enables the obtaining of an impermeable fastening of the crystal whilst liberating such of all mechanical fastening elements or any use of glue but it gives unsatisfactory results from the aesthetic viewpoint. Effectively, the deformation due to the application of the annular punch is produced over the front surface of the crystal. Moreover, such fastening techniques of the crystal bring into action non-negligible mechanical forces in order to obtain the deformation of the material. Such forces introduce internal tensions into the final product which alter the ageing qualities of the watch case provided with its crystal.

The purpose of the invention is to provide a watch case which is impermeable, reliable and of low cost. To this end there is provided a watch case including a caseband at least a peripheral portion of which is formed of plastic material, a back, a metallic bezel covering the caseband and extending over at least a part of the outer edge face of the caseband and impermeable assembly means for the caseband and the bezel, said assembly means comprising a first annular seat extending radially in the bezel, an annular protuberance integrally formed with the caseband portion of plastic material and extending radially into the interior of the first seat, said protuberance and said first seat being arranged in a manner such that the caseband and the bezel are inseparable, a second annular seat conjointly defined by said caseband and said bezel and a packing occupying said second seat.

The invention will now be explained in the description which is to follow given by way of example and with the help of the drawings which illustrate it.

BRIEF DESCRIPTION OF THE DRAWINGS

FIG. 1 is a partial cross-section through a watch case assembled according to a first embodiment of the invention;

FIG. 2 is a partial cross-section through a watch case according to the invention prior to assembling the elements which constitute it;

FIG. 3 is an enlargement of the detail shown within circle III of FIG. 2;

FIG. 4 is a repetition of FIG. 1 additionally showing the watch completely assembled;

DESCRIPTION OF THE PREFERRED EMBODIMENTS

Figure 5:
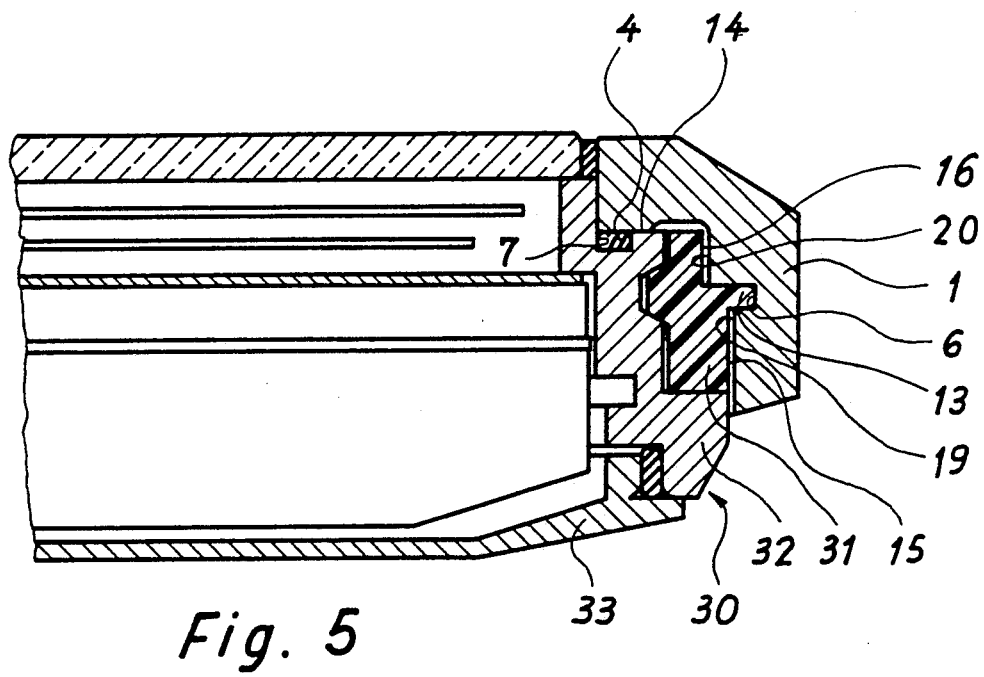
FIG. 5 is a partial cross-section through a watch case assembled according to a second embodiment of the invention.

FIG. 1 shows a watch case assembled according to a first embodiment of the invention. Essentially, it comprises a caseband-back 2 formed of plastic material, a metallic bezel 1 and a packing 4.

The caseband-back formed in a single piece comprises a first disc-shaped part forming the back 9 and a second annular part forming the caseband part 10. This caseband-back is of the monocoque type wherein the movement is assembled from above the caseband 10. Such caseband is provided with an enlarging ring 11 and supports 12 in order to support the movement. One may provide in back 9 an opening (not shown on the drawing) to enable changing of the battery. This opening will then be stopped up by a cover. The monocoque type of caseband-back presents the advantage of simplifying the assembly of the watch on automatic transfer machines. Effectively, all loading operations take place from the same side, i.e. the top of the watch, and it is not necessary to turn over such watch in order to provide it with the necessary components. This embodiment likewise has the advantage of providing a back which takes up very little space in the thickness of the watch.

Obtaining the caseband-back of plastic material also provides a major advantage of having a part which is much less expensive than if the caseband-back were obtained of steel. Effectively, this part, in view of the complications which it exhibits and in view of the precision with which it must be formed, is expensive when made in metal since it requires numerous and costly machining operations which must be executed on each part taken individually. With plastic material the complications and precision are brought back to construction of the injection mould which enables the realization of a large number of parts with the desired finish and without retouching operations following the injection. The fact that the enlarging ring may be moulded at the same time as the caseband-back also presents an evident advantage since an extra part may be avoided. It will be also noted that allergic phenomena which may provoke irritation of the skin by a steel back are no longer found with a back of plastic material.

It nevertheless remains a fact that a caseband-back of plastic material does not exhibit solely advantages even if one notes only the mediocre aesthetic aspect of its visible parts (edge of the caseband and bezel). This gives to the watch an impression of cheapness which it would be preferable to avoid, above all, for a watch of mid-range quality. Furthermore, it will be understood that the visible parts are very much solicited by external mechanical stresses which render them very sensitive to scratches, resulting in rapid degradation of the aesthetic aspect. In order to avoid this, the watch proposed here includes a metallic bezel 1 covering the caseband portion 10 and extending over at least a portion of the outer edge face of said caseband part. This bezel may be of steel which may be coated or not by a decorative coating (hard material, gilding, etc.).

In order to assemble the caseband-back to the bezel several solutions may be envisaged, in particular those which have been mentioned in view of the documents cited hereinabove, but which are not necessarily suitable for the reasons mentioned. One could also employ a standard closure or one with a snap of the type described in the Swiss patent document No. CH-A-230.526 where the back is provided over its periphery by a flange having attachment bars cooperating with grooves provided within the caseband and this in a manner such that the back is maintained in a state of forced tension and tends to crush a packing arranged between the back and the caseband. This latter manner of operation is not satisfactory in the case where the back is of plastic material. It may in effect be determined that impermeability cannot be guaranteed since the fastening may present irregular forces over the packing which leads to pinching of such packing which is not constant over its entire periphery. Furthermore, the grooves borne by the metallic caseband may exhibit cutting edges capable of damaging the attachment bars of plastic material.

Thus, according to the invention and referring once again to FIG. 1, the impermeable sealing means of the caseband-back 2 and the bezel 1 comprise a first annular seat 6 extending radially into the bezel 1 and on the interior of which is found housed an annular protuberance 13 formed integrally with the caseband-back 2. In view of the form given to seat 6 and to protuberance 13 which is housed therein, the caseband- back 2 becomes inseparable from bezel 1. At the same time according to the invention, the assembly means include further a second annular seat 7 which is defined conjointly by the caseband-back and the bezel and the packing 4 which occupies this second seat. This packing renders the case impermeable to liquids which might be introduced between the caseband 10 and the bezel 2 and thereafter penetrate to the interior of the watch in the region of the dial.

FIG. 1 shows in particular that the second annular seat 7 is located between the bezel 2 and the top of the caseband part 10 and is formed by a groove provided in bezel 2, such groove being closed by the top 14 of the caseband portion 10. Without it being necessary to show such by a drawing, it will be readily understood that the groove may be located in the top 14 of the caseband portion 10, this latter being closed then by an upper flat edge exhibited by the bezel.

The caseband-back is of a plastic material. There is available an entire range of materials suitable for this manufacture. One could employ a material chosen from the group comprising acryl butadiene styrene (ABS), acryl styrene acryl-ester (ASA) and styrene acryl nitrile (SAN). Such could also be a polyamide reinforced with glass globules or fibers.

The case which has just been described is perfectly impermeable and presents excellent serviceability. Effectively, the attachment of the caseband-back and the bezel being inseparable, the packing remains compressed in its seat in a constant manner whatever be the stresses which may be exerted on the case such as shocks or temperature variations for instance. Furthermore, it is inexpensive whilst assuring close and easily reproducible dimensional tolerances as has already been mentioned hereinabove.

The watch case subject of this invention is constituted beginning with a set of components including a caseband-back 2, a bezel 1 and a packing 4 which may appear prior to assembly in a form which is now to be described, the different components being best illustrated on FIGS. 2 and 3, FIG. 3 being an enlargement of what has been shown in circle III of FIG. 2.

The exterior periphery of the caseband part 10 of the caseband-back 2 presents a staircase structure which comprises a first lower wall 15, a second upper wall 16 and a bevelled step 17 forming an acute angle $\alpha$ with the second wall 16, this step presenting thus a ridge 18 having a pointed form. The bezel 1 includes first 19 and second 20 interior faces adapted respectively to match the form of the first and second walls of the caseband portion. The first seat 6 provided in the bezel 1 already described hereinabove is located between faces 19 and 20. Against a horizontal face 21 of seat 6, the ridge 18 in the form of a point as seen from the section of the caseband portion 10, is brought to bear when the caseband-back 2 is introduced into the bezel 1. The component set shown on FIGS. 2 and 3 includes further the packing 4 disposed in the second seat 7 of bezel 1.

The bevelled step 17 may be provided entirely around the caseband portion 10. If the movement introduced into the watch possesses a time setting stem, one may interrupt the bevelled step 17 in the neighbourhood of such stem in order to accommodate a tube forming an integral portion of the caseband-back 2, such tube receiving said stem. In the same manner, the bevelled step 17 may be discontinuous and show several segments annularly disposed around the section of the caseband. One may also envisage without departing from the present invention that the first seat is not continuous, but arranged in several cut-outs provided in the bezel, each of such cut-outs receiving a bevelled segment 17. Such arrangement could serve for angularly positioning caseband-back 2 relative to the bezel 1.

There now remains to explain how one proceeds to assemble the watch case in accordance with the invention.

One begins by introducing the caseband-back into the bezel 1 to the point where the edge 18 in point form butts against the face 21 of the first seat 6 of the bezel 1 (see this starting position on FIGS. 2 and 3). With bezel 1 resting on a support one next exerts pressure on the caseband-back 2 by means of a sonic transducer 22 providing mechanical vibrations at high frequency and these in the direction of the arrow 23. The ultrasonic energy thus provided will initially cause melting of the edge 18 in point form in which is concentrated all the energy produced by the sonic transducer, then melting of the entire bevelled step 17 and even material situated below such step, the material in fusion thereafter filling up the first seat of bezel 1. One will finally interrupt such pressure when the top 14 of the caseband part 10 comes into contact with bezel 1. At this moment the packing 4 is compressed into the second seat 7 and the operation is terminated from which there results a sealed and inseparable assembly. The case is then as shown on FIG. 1.

It can be mentioned that it would be also possible to apply the sonic transducer onto the bezel, the support then being on the caseband-back. One would arrive thus at the same results.

FIG. 4 is a partial cross-sectional view at 12 o'clock of the watch completely assembled employing the case forming the object of the invention. This figure repeats what is shown on FIG. 1 for the case alone. Having available such case, one begins by mounting movement 24 of which an outer edge rests on the shoulder 12 of the caseband-back 2. Next the dial 25 is positioned and thereafter the hands 26. Flange 27 is introduced into the interior periphery of bezel 1. Finally, the crystal 28 is driven in and is rendered impermeable by the sealing gasket 29 on flange 27. One thus obtains a watch having a plastic monocoque caseband-back covered over by a metallic bezel, such watch having a very well finished aspect and good impermeability. It will be noted that the metallic bezel will be attached to a bracelet according to well-known methods and which have not been shown on the drawing.

FIG. 5 shows a watch case assembled according to a second embodiment of the invention. It includes essentially a caseband 30, at least a peripheral portion of which is formed of plastic material. Here the caseband is no longer made entirely of plastic material, but comprises a metallic ring 32 surrounded by a shroud 31 made of plastic material. In this construction one also notes that the back 33 of the case is independent from the caseband and is assembled thereto by a snap arrangement for instance.

FIG. 5 shows however that here also assembly means are employed similar to those described having regard to the first embodiment. Effectively, there will be found the first annular seat 6 extending radially into the bezel 1, the same annular protuberance 13 integrally formed with the plastic material portion 31 of the caseband and the second annular seat 7 in which is housed a packing 4.

Figure 6:
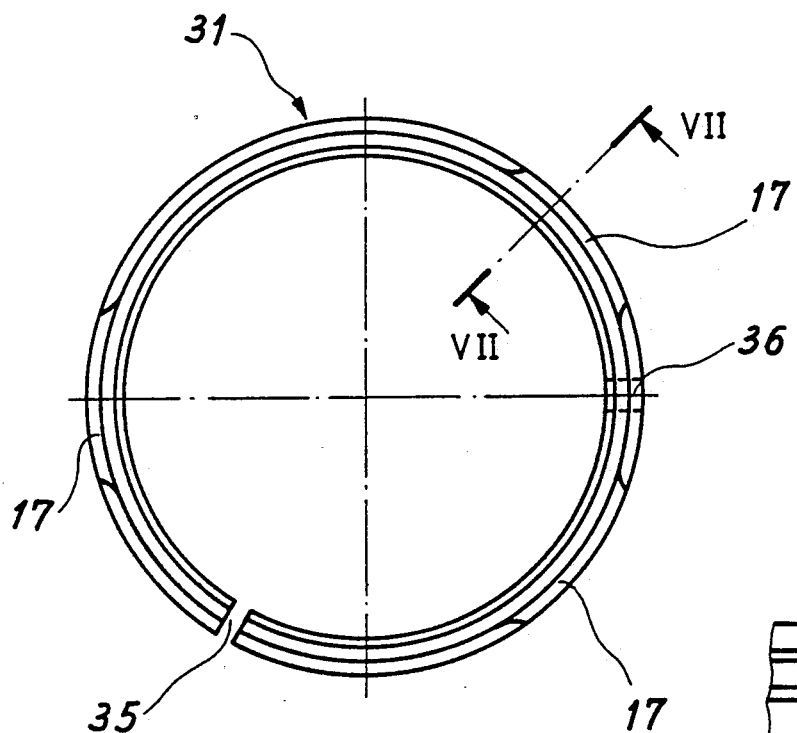
FIG. 6 is a top view of the shroud of plastic material applied to the caseband shown on FIG. 5.
Figure 7:
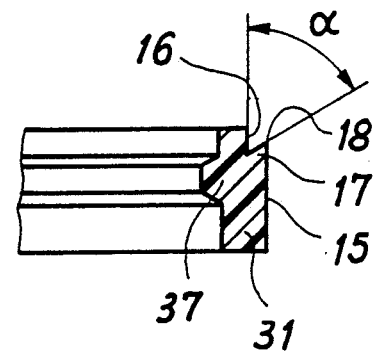
FIG. 7 is a cross-section according to dot-dashed line VII-VII of FIG. 6.

The shroud 31 is shown alone on FIGS. 6 and 7. Here it is shown as a ring split at 35 and which includes three zones or bevelled steps 17. The ring is pierced by a hole 36 through which will pass the winding or time setting stem. As may be readily seen on FIG. 7 which is a cross-section according to dot-dashed line VII—VII of FIG. 6, the shroud likewise includes an outer periphery in the form of a staircase with its first lower wall 15, its second upper wall 16 and its bevelled step 17 forming an acute angle α with the second wall and exhibiting an edge 18 having a pointed form. The first and second walls 15 and 16 are respectively adapted to match the form of the first 19 and second 20 interior faces of bezel 1 as shown on FIG. 5. The assembly is thus effected in the same manner as that which has been described having reference to FIGS. 1 to 4 according to the same method employing ultrasonic vibrations. There is thus no need to revert further thereto at this point.

FIGS. 5 and 7 will facilitate understanding that the shroud 31 is compressed around ring 32 simply through its own elasticity. A trapezoidal boss disposed at the interior of shroud 31 cooperates with a housing of the same form provided in ring 32. The split 35 of the shroud enables a slight spreading apart thereof and the placing of it on the ring. The shroud may however be moulded directly on such ring.

In contrast to what has been said with respect to the first embodiment, this second embodiment exhibits a more standard form in the sense that the movement is introduced from below and that the case is closed by a back which may be screwed in or snap-fastened. The crystal rests on a flange which is formed integrally with ring 32.

This second embodiment is particularly interesting when one is concerned with assembling two metallic parts of different nature, for instance steel for the caseband and hard metal for the bezel. It is known that hard metals (TiN, WC, for instance) exhibit dimension figures which cannot be maintained within close tolerances in the raw state, this generally necessitating machining the part in a subsequent stage. This stage is no longer necessary if one employs the shroud proposed by the invention since it is this shroud which will accommodate itself to these tolerances, the caseband being itself sufficiently precise, by profile turning for instance, to receive the movement and the back.

What I claim is:

1. A method of assembling a watch case of the type including a caseband at least a peripheral portion of which is formed of plastic material, a back, a metallic bezel covering the caseband and extending over at least a part of an outer edge face of the caseband and impermeable assembly means for the caseband and the bezel, said assembly means comprising a first annular seat extending radially in the bezel, an annular protuberance integrally formed with the caseband portion of the plastic material and extending radially into the interior of the first seat, a second annular seat conjointly defined by said caseband and said bezel and a packing occupying said second annular seat said method comprising: exerting a pressure to move said caseband and said bezel toward each other and, while said pressure is being exerted, thermally deforming at high frequency a localized zone of said caseband so that the thermically deformed material of said localized zone of said caseband is forced into said first annular seat in said bezel to form said annular protuberance as the packing is compressed in said annular seat.

2. A method for assembling a watch case comprising the following steps:

providing a set of components including a caseband, at least a peripheral portion of which is of plastic material, a bezel and a packing wherein said peripheral portion of plastic material exhibits a staircase formed outer periphery including a lower first wall, an upper second wall and a bevelled step forming an acute angle α with the second wall and exhibiting a point formed edge, wherein said bezel includes first and second inner lateral faces respectively adapted to match the form of the first and second walls of the caseband, a first seat being located between said lateral faces and against a surface of which said point formed edge is pressed when the caseband is introduced into the bezel and wherein the packing is placed within a second seat located in the top of the caseband or in the portion of the bezel facing the upper part of the caseband;

introducing the caseband into the bezel until the point formed edge on the caseband butts against the said surface of the first seat of the bezel;

exerting a pressure on the caseband or the bezel by means of a sonic transducer providing mechanical vibrations at high frequency to effect fusion of the bevelled step and filling of the first seat of the bezel with the fused material and interrupting the pressure when the top of the caseband comes into contact with the bezel, the packing then being compressed into the second seat and the end result comprising a watch case impossible to disassemble.

3. A method for assembling a watch case comprising the following steps:

providing a caseband (10, 30) at least a peripheral portion (10, 31) of which is of plastic material exhibiting a staircase-formed outer periphery including a lower first wall (15), an upper second wall (16) and a bevelled step (17) forming an acute angle with the second wall and exhibiting a point formed edge (18);

providing a bezel (1) exhibiting first (19) and second (20) inner lateral faces respectively adapted to match the form of the first and second walls of the caseband, a first seat (6) being located between said lateral sides and against a surface (21) of which said point formed edge is pressed when the caseband is introduced into the bezel;

providing a packing (4) which is placed within a second seat (7) located between the bezel and the top of the caseband;

introducing the caseband into the bezel until the point formed edge of the caseband butts against the said surface of the first seat of the bezel;

exerting a pressure (23) on the caseband or the bezel by means of a sonic electrode (22) providing mechanical vibrations at high frequency to effect fusion of the bevelled step and filling of the first seat of the bezel with the fused material and interrupting the pressure when the top of the caseband comes into contact with the bezel, the packing then being compressed into the second seat and the end result comprising a watch case impossible to disassemble.

4. A method as set forth in claim 1 wherein the case band (10) is entirely formed of plastic material together with a back (9) so as to form a one piece caseband-back (2).

5. A method as set forth in claim 1 wherein the caseband (30) is a metallic ring (32) surrounded by a shroud (31) formed of plastic material.

6. A method as set forth in claim 3 wherein the plastic material is chosen from the group comprising acryl butadiene styrene (ABS), acryl styrene acryl-ester (ASA) and styrene acryl nitrile (SAN).

7. A method as set forth in claim 3 wherein the plastic material is of polyamide reinforced with glass globules or fibers.

8. A method as set forth in claim 3 wherein the second seat (7) comprises a groove cut into the bezel (1).

9. A method as set forth in claim 3 wherein the second seat (7) comprises a groove cut into the top (14) of the caseband (10).

10. A method as set forth in claim 4 wherein the plastic material is chosen from the group comprising acryl butadiene styrene (ABS), acryl styrene acryl-ester (ASA) and styrene acryl nitrile (SAN).

11. A method as set forth in claim 4 wherein the plastic material is of polyamide reinforced with glass globules or fibers.

12. A watch case assembled according to the method of claim 1.

13. A watch case assembled according to the method of claim 1.

14. The method as claimed in claim 2 wherein said bezel is a metal bezel.

15. The method as claimed in claim 3 wherein said bezel is a metal bezel.

* * * * *

UNITED STATES PATENT AND TRADEMARK OFFICE
CERTIFICATE OF CORRECTION

PATENT NO. : 4,993,007
DATED : February 12, 1991
INVENTOR(S) : Leonhard Meister

It is certified that error appears in the above-identified patent and that said Letters Patent is hereby corrected as shown below:

Column 8, line 17, for "claim 1" read -- claim 3 --.

Column 8, line 22, for "claim 1" read -- claim 3 --.

Column 8, line 44, for "claim 1" read -- claim 3 --.

Signed and Sealed this

Ninth Day of June, 1992

Attest:

DOUGLAS B. COMER

Attesting Officer

Acting Commissioner of Patents and Trademarks